(12) United States Patent
Kyono et al.

(10) Patent No.: US 11,459,116 B2
(45) Date of Patent: Oct. 4, 2022

(54) VIRTUAL LASER POINTER AS A POINT OF CONTACT INDICATOR FOR MACHINE LEARNING ASSISTED AERIAL REFUELING OR OTHER TARGETING

(71) Applicant: The Boeing Company, Chicago, IL (US)

(72) Inventors: Trent M. Kyono, Wailuku, HI (US); Steven F. Griffin, Kihei, HI (US); Jacob A. Lucas, Makawao, HI (US); James L. Clayton, Everett, WA (US); Justin C. Hatcher, Sumner, WA (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 16/910,528

(22) Filed: Jun. 24, 2020

(65) Prior Publication Data

US 2021/0403175 A1 Dec. 30, 2021

(51) Int. Cl.
*B64D 39/00* (2006.01)
*B64D 39/06* (2006.01)
(Continued)

(52) U.S. Cl.
CPC ............ *B64D 39/06* (2013.01); *B64D 43/00* (2013.01); *G06K 9/6256* (2013.01); *G06N 3/08* (2013.01); *G06V 20/13* (2022.01)

(58) Field of Classification Search
None
See application file for complete search history.

(56) References Cited

U.S. PATENT DOCUMENTS 5,530,650 A * 6/1996 Biferno .................. B64D 39/00
244/172.4
7,980,512 B1 * 7/2011 Speer ................. C07D 271/113
244/135 A
(Continued)

OTHER PUBLICATIONS

NASA, "Synthetic Vision Would Give Pilots Clear Skies All the Time (FS-2000-02-48-LaRC)," [Online]. Available: https://www.nasa.gov/centers/langley/news/factsheets/SynthVision.html. [Accessed Dec. 5, 2017].
(Continued)

*Primary Examiner* — Martin Mushambo
(74) *Attorney, Agent, or Firm* — McDonnell Boehnen Hulbert & Berghoff LLP (57) ABSTRACT

An example system includes a processor and a non-transitory computer-readable medium having stored therein instructions that are executable to cause the system to perform various functions. The functions include: (i) acquiring an image of a first aerial vehicle, the image depicting an object of a second aerial vehicle prior to contact between the object and a surface of the first aerial vehicle; (ii) providing the image as input to a data-driven analyzer that is trained in a supervised setting with example images for determining a predetermined point of contact between the object and the surface of the first aerial vehicle; (iii) determining, based on an output of the data-driven analyzer corresponding to the input, an estimated point of contact between the object and the surface of the first aerial vehicle; and (iv) providing the estimated point of contact to a display system.

20 Claims, 8 Drawing Sheets

(51) Int. Cl.
  *G06K 9/62* (2022.01)
  *B64D 43/00* (2006.01)
  *G06N 3/08* (2006.01)
  *G06V 20/13* (2022.01)

(56) References Cited

U.S. PATENT DOCUMENTS

| | | | | |
|---|---|---|---|---|
| 8,370,002 | B2* | 2/2013 | Stecko | B64D 39/00 244/221 |
| 8,788,124 | B2* | 7/2014 | Coll Herrero | B64D 39/00 244/135 A |
| 9,067,689 | B2* | 6/2015 | Chang | B64D 39/00 |
| 10,388,029 | B1* | 8/2019 | Taylor | G06T 7/75 |
| 10,875,665 | B2* | 12/2020 | Peng | B60L 53/36 |
| 2003/0209633 | A1* | 11/2003 | Thal | B64D 39/06 244/135 A |
| 2009/0248225 | A1 | 10/2009 | Stecko et al. | |
| 2016/0085426 | A1 | 3/2016 | Scott | |
| 2018/0210466 | A1 | 7/2018 | Weaver et al. | |
| 2018/0281986 | A1 | 10/2018 | Chang et al. | |
| 2019/0344902 | A1 | 11/2019 | Cramblitt | |

OTHER PUBLICATIONS

S. Prehn, "Advanced Vision Guided Robotics," [Online], Available: https://www.visiononline.org/userAssets/aiaUploads/file/CVP_Advanced-Vision-Guided-Robotics_Steven-Prehn.pdf1. [Accessed Dec. 5, 2017].

A. Agrawal, Y. Sun, J. Barnwell and R. Raskar, "Vision Guided Robot System for Picking Objects By Casting Shadows," International Journal of Robotics Research, vol. 29, No. 2-3, pp. 155-173, Nov. 13, 2009.

* cited by examiner

VIRTUAL LASER POINTER AS A POINT OF CONTACT INDICATOR FOR MACHINE LEARNING ASSISTED AERIAL REFUELING OR OTHER TARGETING

FIELD

The present disclosure relates generally to aerial refueling, and more particularly, to systems and methods for using a virtual laser pointer as a point of contact indicator during aerial refueling.

BACKGROUND

One form of aerial refueling involves a complex targeting operation combined with a controlled docking of a refueling boom from a supply aircraft to a receptacle on a receiver aircraft. As part of this operation, an operator of the supply aircraft can use images from a camera to direct the refueling boom to dock with the receptacle on the receiver aircraft. The operator can control an angle of the refueling boom as well as a deployed length of the refueling boom.

SUMMARY

In one example, a system including a processor and a non-transitory computer-readable medium is described. The non-transitory computer-readable medium has stored therein instructions that are executable to cause the system to perform various functions. The functions include acquiring an image of a first aerial vehicle. The image is acquired by a second aerial vehicle and depicts an object of the second aerial vehicle prior to contact between the object of the second aerial vehicle and a surface of the first aerial vehicle. The functions also include providing the image as input to a data-driven analyzer that is trained in a supervised setting with example images for determining a predetermined point of contact between the object of the second aerial vehicle and the surface of the first aerial vehicle. The data-driven analyzer is configured to estimate an actual point of contact between the object of the second aerial vehicle and the surface of the first aerial vehicle based on features extracted from the image. In addition, the functions include determining, based on an output of the data-driven analyzer corresponding to the input, an estimated point of contact between the object of the second aerial vehicle and the surface of the first aerial vehicle. The functions further include providing the estimated point of contact to a display system.

In another example, a method is described. The method includes acquiring an image of a first aerial vehicle. The image is acquired by a second aerial vehicle and depicts an object of the second aerial vehicle prior to contact between the object of the second aerial vehicle and a surface of the first aerial vehicle. The method also includes providing the image as input to a data-driven analyzer that is trained in a supervised setting with example images for determining a predicted point of contact between the object of the second aerial vehicle and the surface of the first aerial vehicle. The data-driven analyzer is configured to estimate an actual point of contact between the object of the second aerial vehicle and the surface of the first aerial vehicle based on features extracted from the image. In addition, the method includes determining, based on an output of the data-driven analyzer corresponding to the input, an estimated point of contact between the object of the second aerial vehicle and the surface of the first aerial vehicle. Further, the method includes overlaying an indication of the estimated point of contact on the surface of the first aerial vehicle within a video stream of the first aerial vehicle.

In another example, a non-transitory computer-readable medium is described. The non-transitory computer-readable medium has stored therein instructions that are executable to cause a system to perform various functions. The functions include acquiring an image of a first aerial vehicle. The image is acquired by a second aerial vehicle and depicts an object of the second aerial vehicle prior to contact between the object of the second aerial vehicle and a surface of the first aerial vehicle. The functions also include providing the image as input to a data-driven analyzer that is trained in a supervised setting with example images for determining a predicted point of contact between the object of the second aerial vehicle and the surface of the first aerial vehicle. The data-driven analyzer is configured to estimate an actual point of contact between the object of the first aerial vehicle and the surface of the first aerial vehicle based on features extracted from the image.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

As noted above, an operator of a supply aircraft can use images from a camera to direct a refueling boom to dock with a receptacle on a receiver aircraft. For instance, a display system of the supply aircraft can display the images within a video stream to help the operator control the refueling boom. In practice, this task can be challenging due to relevant movement between the supply aircraft and the receiver craft, poor lighting conditions, and the difficulty of trying to interpret three-dimensional information from a camera that provides two-dimensional information. For instance, it can be difficult for an operator to perceive a depth between the refueling boom and the receptacle, predict how much to deploy the refueling boom, and/or to predict how turbulence will affect movement of the refueling boom. Despite these difficulties, it is desirable that the refueling boom contact only the receptacle, as impacting the receiving aircraft with the refueling boom can damage both the receiver aircraft and the refueling boom.

Recent advances in machine learning have pushed the computer vision boundary. Specifically, through the utilization of supervised learning and large annotated datasets, machine learning models are becoming increasingly more powerful, practical, and feasible for operational integration. An innovation that would greatly aid an operator in aerial refueling is to know exactly where a refueling boom would contact a receiver aircraft if the refueling boom were extended at any given time.

Within examples, systems and methods for using machine learning to predict an estimated point of contact between a surface of a first aerial vehicle and an object of a second aerial vehicle are described. In accordance with the present disclosure, after a computing system predicts the estimated point of contact using a data-driven analyzer, a display system can then display an indication of the estimated point of contact within a video stream of the first aerial vehicle. For example, the display system can overlay an indication of the estimated point of contact on the surface of the first aerial vehicle within a video stream of the first aerial vehicle.

In an example method, an image of a first aerial vehicle can be acquired by a second aerial vehicle. The image can depict an object of the second aerial vehicle prior to contact between the object of the second aerial vehicle and a surface of the first aerial vehicle. For instance, the first aerial vehicle can be a receiver aircraft, the second aerial vehicle can be a supply aircraft, and the object can be a refueling boom.

The image can then be provided to a data-driven analyzer that is trained in a supervised setting. For instance, the data-driven analyzer can be trained with example images for determining a predicted point of contact between the object of the second aerial vehicle and a surface of the first aerial vehicle. The example images that the data-driven analyzer is trained on can include synthetic (e.g., simulated) images, laboratory generated images, or real images that are acquired during flight. Further, the data-driven analyzer can be configured to estimate an actual point of contact between the object of the second aerial vehicle and the surface of the first aerial vehicle based on features extracted from the image.

Based on an output of the data-driven analyzer corresponding to the input, a computing system can determine an estimated point of contact between the object of the second aerial vehicle and the surface of the first aerial vehicle. A display system can then overlay an indication of the estimated point of contact on the surface of the first aerial vehicle within a video stream of the first aerial vehicle.

One technique of displaying the indication is to project a virtual laser pointer onto the first aerial vehicle at a location where the object would contact the surface of the first aerial vehicle if deployed. A benefit of the virtual laser pointer approach is that a physical laser pointer can be incorporated into a scaled hardware mockup, computer-generated imagery, or actual flight imagery to aid in training of the data-driven analyzer, since the true position of the first aerial vehicle, the second aerial vehicle, and the object of the second aerial vehicle as well as the two-dimensional imagery that the operator sees, is available in these scenarios.

In one approach for generating training images, a laser pointer can be added to a computer simulation that simulates relative motion between the first aerial vehicle and the second aerial vehicle such that computer-generated imagery of the surface of the first aerial vehicle includes a dot or other indication produced by the laser. In a similar manner, in a laboratory setting, a physical laser pointer can be incorporated into a scaled hardware mockup by attaching the physical laser pointer to the object of the second aerial vehicle. Images of the surface of the first aerial vehicle captured in the laboratory will then include a dot or other indication produced by the laser pointer when the projection from the physical laser pointer intersects the surface of the first aerial vehicle. Additionally or alternatively, a physical laser pointer can be added to the object of the second aerial vehicle for the purpose of generating training images of the surface of the first aerial vehicle during flight.

Another benefit of the virtual laser pointer approach to representing the estimated point of contact is that this feature can be added to a display system of the second aerial vehicle without having to modify the second aerial vehicle to include additional hardware. During flight, the data-driven analyzer can estimate the point of contact and provide the estimate to a display system, such that the display system can overlay an indication of the point of contact on the video stream the operator is viewing. In this manner, the operator can more easily predict and control deployment of the object.

In some instances, the data-driven analyzer can be configured to estimate additional information as well, such as a separation distance between the object of the second aerial vehicle and the surface of the first aerial vehicle and/or a confidence of the estimated point of contact between the object and the surface of the first aerial vehicle. Indications of the separation distance and/or confidence can also be displayed within the video stream for use by an operator in controlling deployment of the object.

Various other features of these systems and methods are described hereinafter with reference to the accompanying figures.

Figure 1:
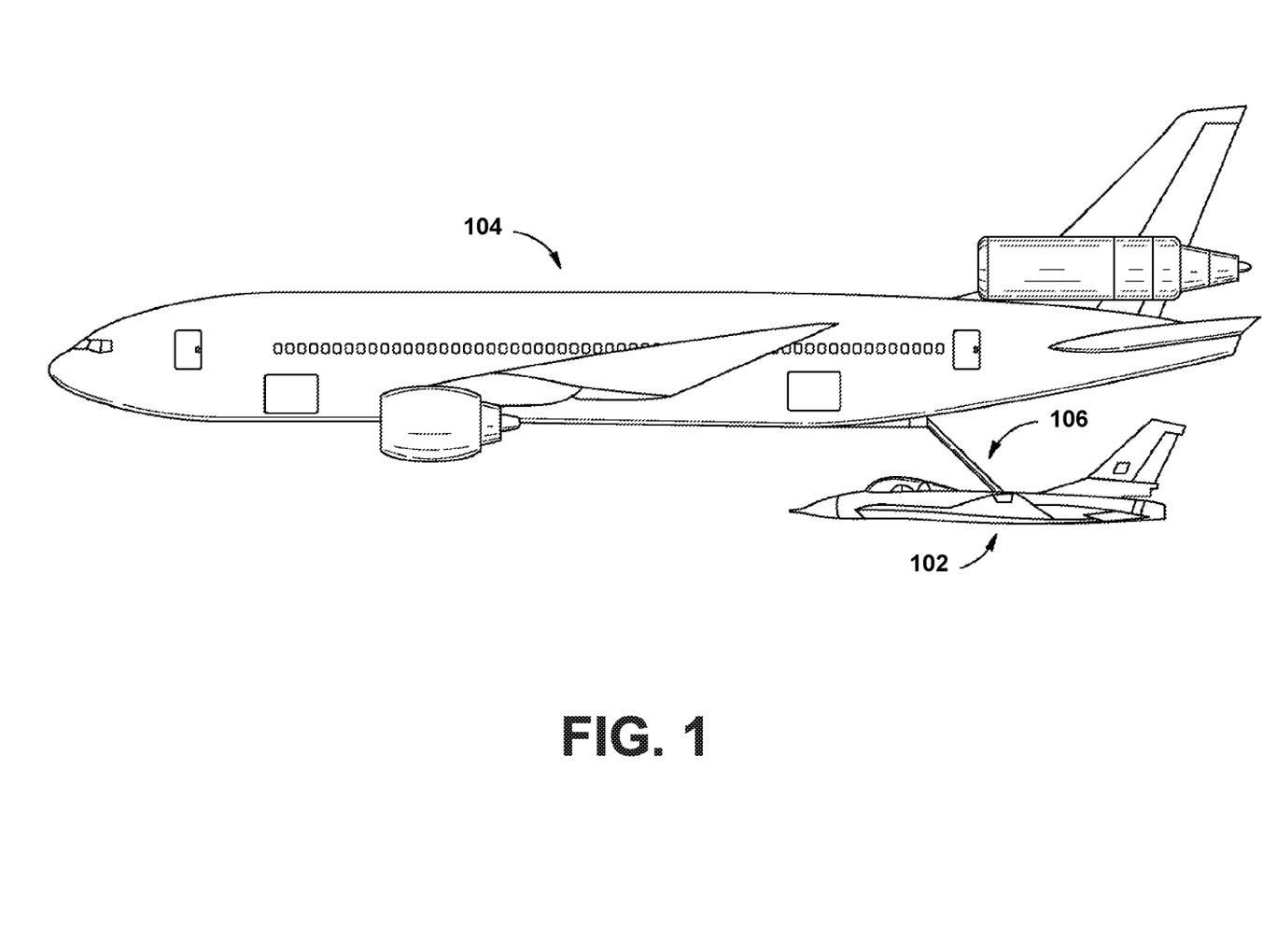
FIG. 1 illustrates a first aerial vehicle and a second aerial vehicle, according to an example.

Referring now to FIG. 1, FIG. 1 illustrates a first aerial vehicle 102 and a second aerial vehicle 104, utilizing a system according to example implementations of the present disclosure. As shown, first aerial vehicle 102 can take the form of a receiver aircraft, and second aerial vehicle 104 can take the form of a supply aircraft that is refueling the receiver aircraft using a refueling boom. Second aerial vehicle 104 can include a system for aiding maneuvering of the refueling boom.

Figure 2:
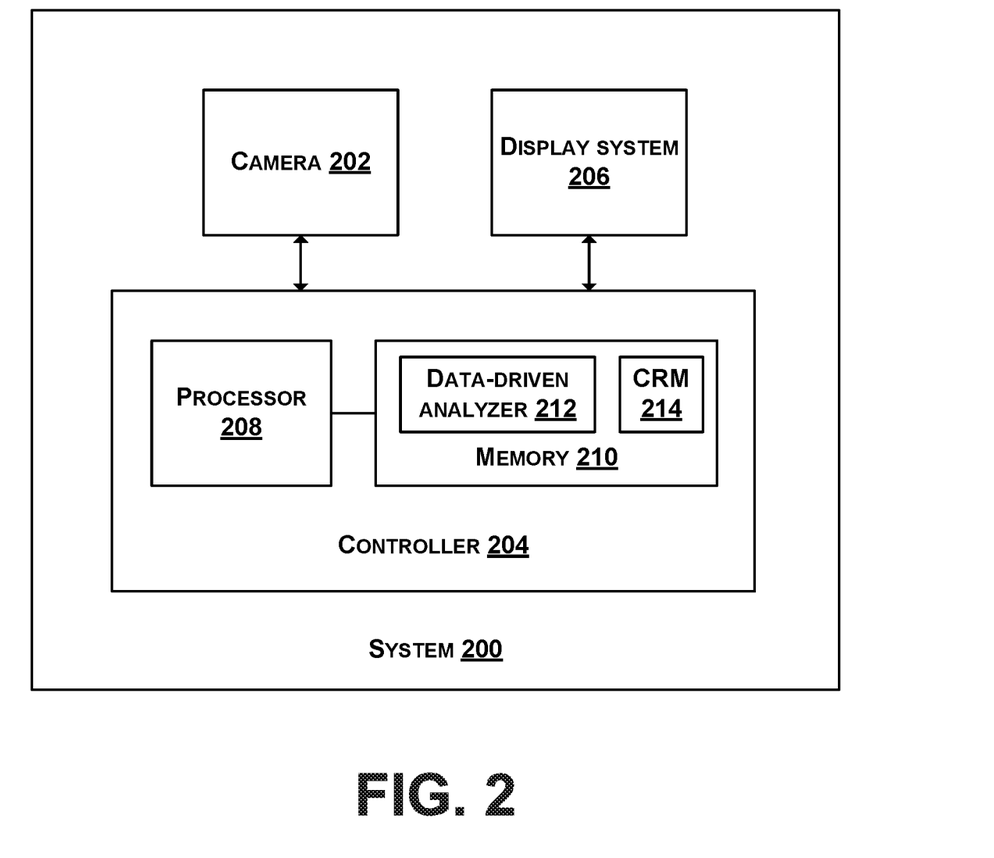
FIG. 2 illustrates a system, according to an example.

FIG. 2 illustrates a system 200 for aiding maneuvering of an object of an aerial vehicle, according to example implementation of the present disclosure. As shown in FIG. 2, system 200 includes a camera 202, a controller 204, and a display system 206. In line with the discussion above, system 200 can be positioned within a supply aircraft having a refueling boom. Camera 202, controller 204, and display system 206 may be co-located or directly coupled to one another, or in some examples, they may communicate with one another across one or more computer networks. For instance, camera 202, controller 204, and display system 206 can be in wired or wireless communication with each other by way of one or more communication links or in wired or in wired or wireless communication with a central computing device.

In some examples, camera 202 is configured to obtain one or more images of a first aerial vehicle, such as a receiver aircraft having a receptacle for refueling the receiver aircraft. The receiver aircraft may be in flight and the supply aircraft having the system 200 may also be in flight to perform the task of refueling the receiver aircraft through a refueling boom. Camera 202 may acquire the images, and controller 204 may obtain the images from camera 202. Camera 202 can include a charge-coupled device (CCD) camera, for instance.

Controller 204 can take the form of a control unit, laptop computer, mobile computer, wearable computer, tablet computer, desktop computer, or other type of computing device. As such, controller 204 includes a processor 208 and a memory 210. Processor 208 could be any type of processor, such as a microprocessor, digital signal processor, multicore processor, etc. Memory 210 can include a non-transitory computer readable medium (CRM) 214 storing program instructions that are executable by processor 208 or a group of processors to carry out any of the controller functions described herein. Controller 204 can further include an input device and one or more communication ports through which controller 204 is configured to communicate with other components of system 200 or other devices that are external to system 200.

After obtaining one or more images from camera 202, controller 204 is configured to estimate an actual point of contact between the object of the second aerial vehicle and a surface of the first aerial vehicle using the one or more images. In particular, controller 204 can provide the one or more images as input to a data-driven analyzer 212 stored by memory 210. Data-driven analyzer 212 is trained in a supervised setting with example images for determining a predicted point of contact between the object of the second aerial vehicle and a surface of the first aerial vehicle.

More particularly, data-driven analyzer 212 can include a model that is trained based on supervised (or semi-supervised) learning via maximum likelihood estimation. This learning can include providing example images to the model such that the model can learn with maximum likelihood where a point of contact will be.

As one example, the data-driven analyzer can include a parameterized model that is trained in a supervised setting by introducing a set of example images including an object of a second aerial vehicle and a surface of the a first aerial vehicle that provides an output of a predicted point of contact between the object of the second aerial vehicle and the surface of the first aerial vehicle. With this approach, the parametrized model is configured to estimate an actual point of contact between the object of the second aerial vehicle and the surface of the first aerial vehicle based on features extracted from an image acquired by camera 202.

As another example, the data-driven analyzer can include a neural network that is trained in a supervised setting by introducing a set of example images including an object of a second aerial vehicle and a surface of the a first aerial vehicle that provides an output of a predicted point of contact between the object of the second aerial vehicle and the surface of the first aerial vehicle. One example of a neural network is a convolutional neural network. With this approach, the neural network is configured to estimate an actual point of contact between the object of the second aerial vehicle and the surface of the first aerial vehicle based on features extracted from an image acquired by camera 202.

Further, data-driven analyzer 212 can be configured to utilize either a single image or a sequence of images as input, depending on the desired implementation. In the single-image approach, the trained model can take as input an image of a first aerial vehicle and an object of a second aerial vehicle, and predict, within a two-dimensional image, a point of contact between the surface of the first aerial vehicle and the object of the second aerial vehicle. Similarly, in the multiple-image approach (i.e. time-dependent), the trained model can take as input a sequence of images of a first aerial vehicle and an object of a second aerial vehicle, and predict, within a two-dimensional image, a point of contact between the surface of the first aerial vehicle and the object of the second aerial vehicle.

In line with the discussion above, the example images that data-driven analyzer 212 is trained on can be generated by incorporating a physical laser pointer into a scaled hardware mockup, computer-generated imagery, or actual flight imagery to aid in training of data-driven analyzer 212. As one example, a laser pointer can be added to a computer simulation that simulates relative motion between the first aerial vehicle and the second aerial vehicle such that computer-generated imagery of the surface of the first aerial vehicle includes a dot or other indication produced by the laser. The laser pointer can be coupled to an end of the object and oriented such that the laser outputs a beam in a direction that is parallel to a longitudinal axis of the object. As another example, in a laboratory setting, a physical laser pointer can be incorporated into a scaled hardware mockup by attaching the physical laser pointer to the object of the second aerial vehicle. Images of the surface of the first aerial vehicle acquired in the laboratory will then include a dot or other indication produced by the laser pointer at the intersection between the beam and the surface of the first aerial vehicle. As a further example, a physical laser pointer can be added to the object of the second aerial vehicle for the purpose of generating training images of the surface of the first aerial vehicle during flight.

Various techniques can be used to train data-driven analyzer 212. By way of example, data-driven analyzer 212 can be trained in a supervised setting with stochastic gradient descent using either a least-squares $L_2$ loss cross-entropy (log-loss), or a more sophisticated generative adversarial network (GAN) loss. For this training, software tools such as Tensorflow, PyTorch, etc., can be used.

Data-driven analyzer 212 is configured to estimate an actual point of contact between the object and the surface of the first aerial vehicle based on features extracted from the one or more images. The features extracted from the one or more images can be either actual output features, i.e., keypoints, or can be hidden/latent parameters of a neural network. In either case, the extracted features can be learned through minimizing of the loss during training.

Data-driven analyzer 212 can also be configured to estimate the actual point of contact based on an orientation and position of the first aerial vehicle relative to the second aerial vehicle. With this approach, controller 204 can derive the orientation and position from one or more images acquired by camera 202, and provide the orientation and position as part of the input to data-driven analyzer 212. Determining the orientation and position can involve determining, from points on an image of the first aerial vehicle, an orientation and position of the first aerial vehicle relative to camera 202 using a pose estimation algorithm and a known relationship between the points on the image and corresponding points on a three-dimensional model of the first aerial vehicle. The three-dimensional model of the first aerial vehicle can be stored in memory 210.

In some examples, data-driven analyzer 212 is also be configured to output a confidence of the estimated point of contact. Additionally or alternatively, data-driven analyzer 212 can be configured to estimate a separation distance between the object of the second aerial vehicle and the surface of the first aerial vehicle (e.g., a separation distance between a tip of the refueling boom and a surface of the receiver aircraft).

Controller 204 can provide the estimated point of contact to display system 206. Display system 206 is configured to display a video stream of the first aerial vehicle.

In one example, data-driven analyzer 212 can output a two-dimensional image that includes an indication of the estimated point of contact, and controller 204 can analyze the image to determine coordinates (e.g., an x-y position) of the estimated point of contact. Alternatively, data-driven analyzer 212 can directly output coordinates of the estimated point of contact. Controller 204 can provide the estimated point of contact to a rendering module of display system 206, and the rendering module can then overlay an indication of the estimated point of contact on a video stream of the first aerial vehicle. In examples in which data-driven analyzer 212 outputs a confidence in the estimated point of contact and/or an estimated separation distance, controller 204 can also provide the confidence and/or estimated separation distance to display system 206. The rendering module can then overlay indications of the confidence and/or estimated separation distance on the video stream of the first aerial vehicle. The indication of the confidence can include a size of a shape surrounding the indication of the estimated point of contact. Additionally or alternatively, the indication of the confidence can include a color of the indication of the estimated point of contact.

Figure 3:
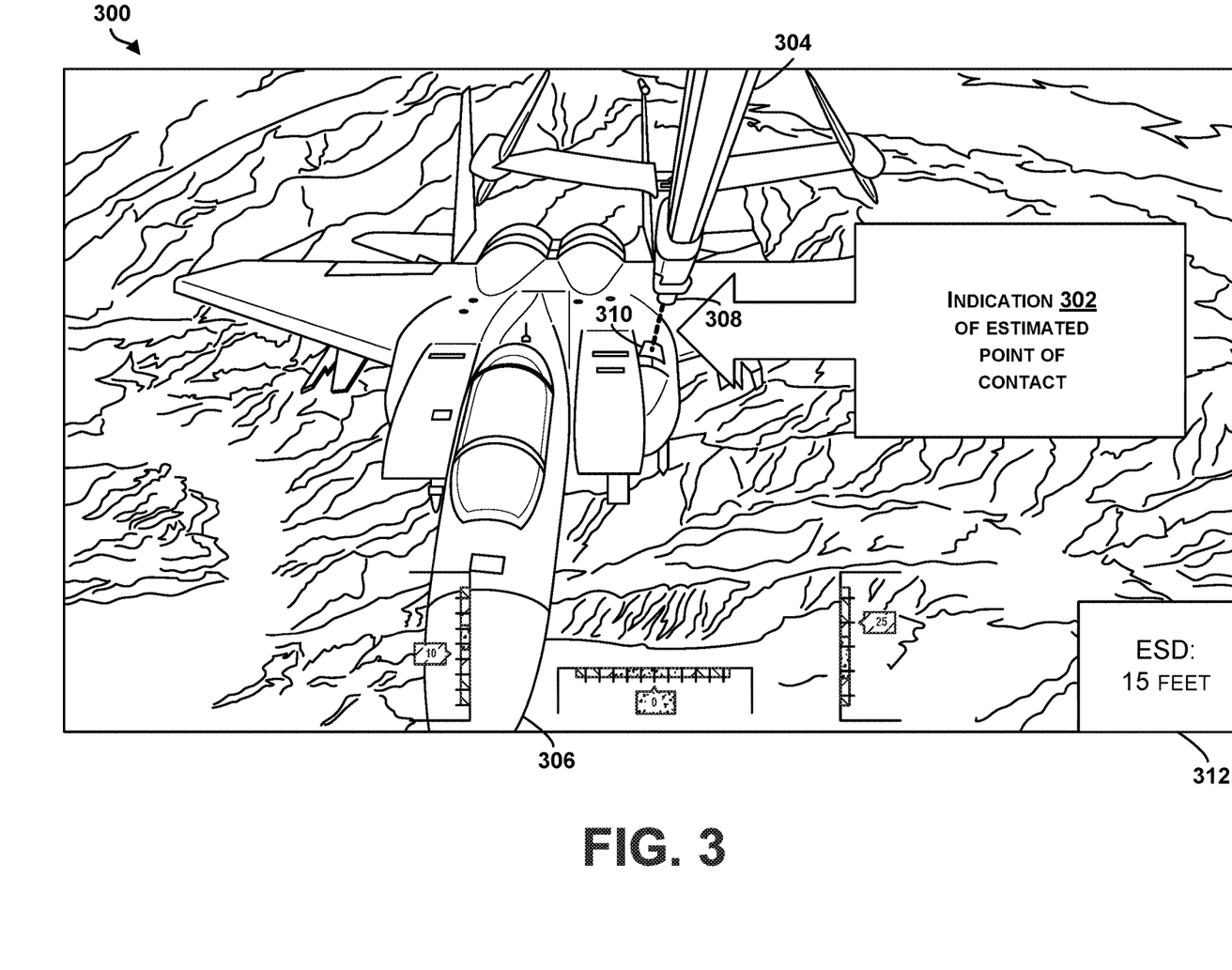
FIG. 3 illustrates a display of a video stream, according to an example.

FIG. 3 illustrates a display of a video stream 300, according to an example. As shown in FIG. 3, an indication 302 of an estimated point of contact between a refueling boom 304 and a surface of a receiver aircraft 306 is overlaid on video stream 300. In FIG. 3, indication 302 is shown as a virtual laser beam output from a tip 308 of refueling boom 304 and in a direction that is parallel to a longitudinal axis of refueling boom 304. In this example, the operator of a supply aircraft is attempting to guid tip 308 of refueling boom 304 into a receptacle 310 on receiver aircraft 306. Indication 302 intersects with receptacle 310. The operator can interpret this to mean that, upon further deployment of refueling boom 304, tip 308 is likely to be received within receptacle 310.

In some examples, indication 302 can include an indication of a confidence of the estimated point of contact. For example, a color of indication 302 can be varied such that the color is indicative of a confidence of the estimated point of contact. With this approach, an operator can interpret the fact that indication 302 is red to mean that the confidence is low (or below a threshold) and can interpret the fact that indication 302 is green to meant that the confidence is high (or above a threshold).

As further shown in FIG. 3, an indication 312 of an estimated separation distance (ESD) between tip 308 and the surface of receiver aircraft 306 is also displayed within video stream. In this example, the ESD is fifteen feet. Indication 312 can aid the operator in determining how much further to deploy refueling boom 304.

Figure 4:
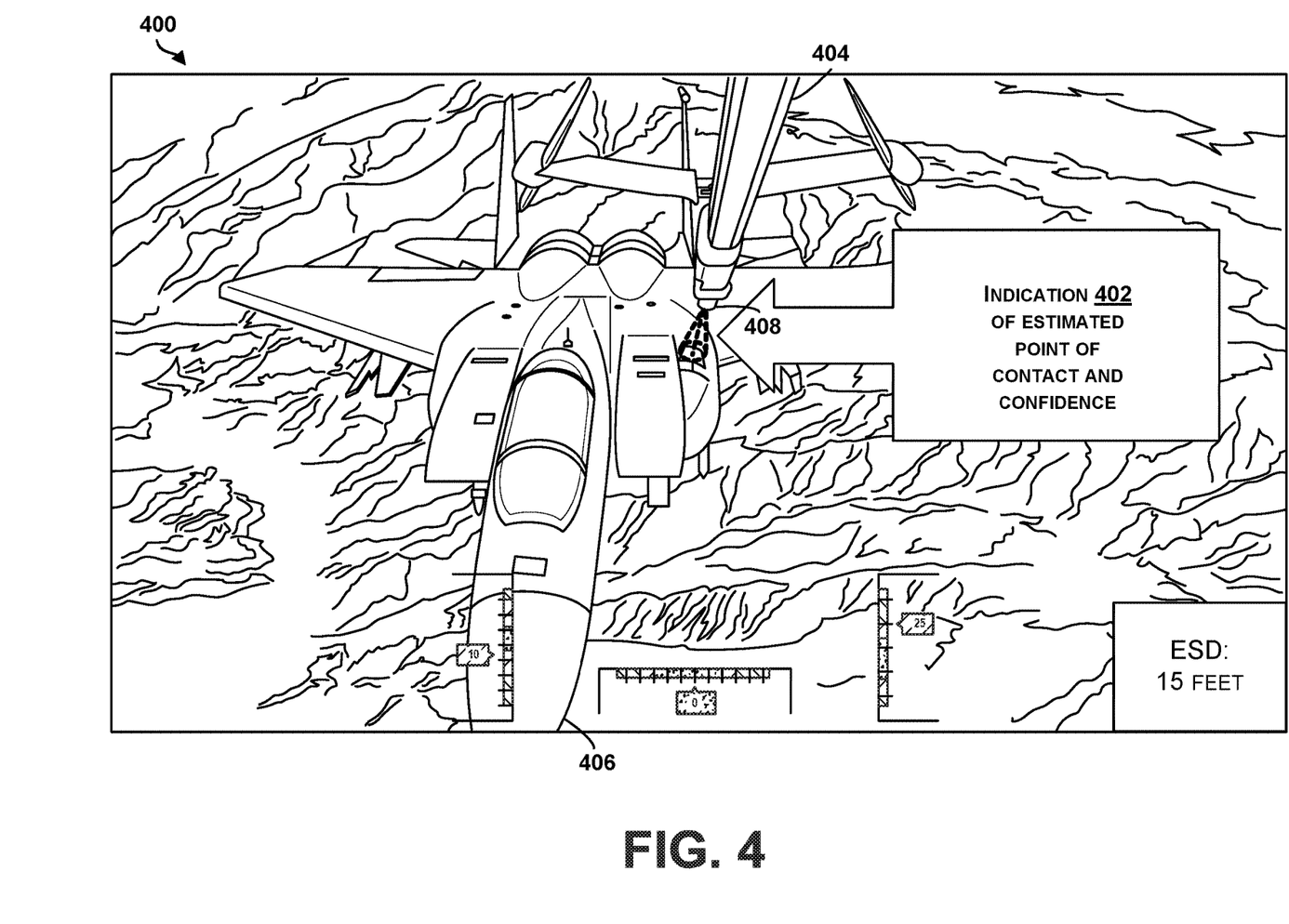
FIG. 4 illustrates another display of a video stream, according to an example.

FIG. 4 illustrates another display of a video stream 400, according to an example. Like video stream 300 of FIG. 3, video stream 400 includes an indication 402 of an estimated point of contact between a refueling boom 404 and a surface of a receiver aircraft 406. However, unlike indication 302 of FIG. 3, indication 402 includes a shape that surrounds indication 402 and serves as an indication of a confidence of the estimated point of contact. In particular, FIG. 4 shows indication 402 as including a virtual cone surrounding a virtual laser beam output from a tip 408 of refueling boom 404. A size of the shape can be varied such that the size is indicative of the confidence of the estimated point of contact. For instance, an operator can interpret the fact that indication 402 includes a large virtual cone to mean that the confidence is low and can interpret the fact that indication 402 includes a small virtual cone to mean that the confidence is high.

Figure 5:
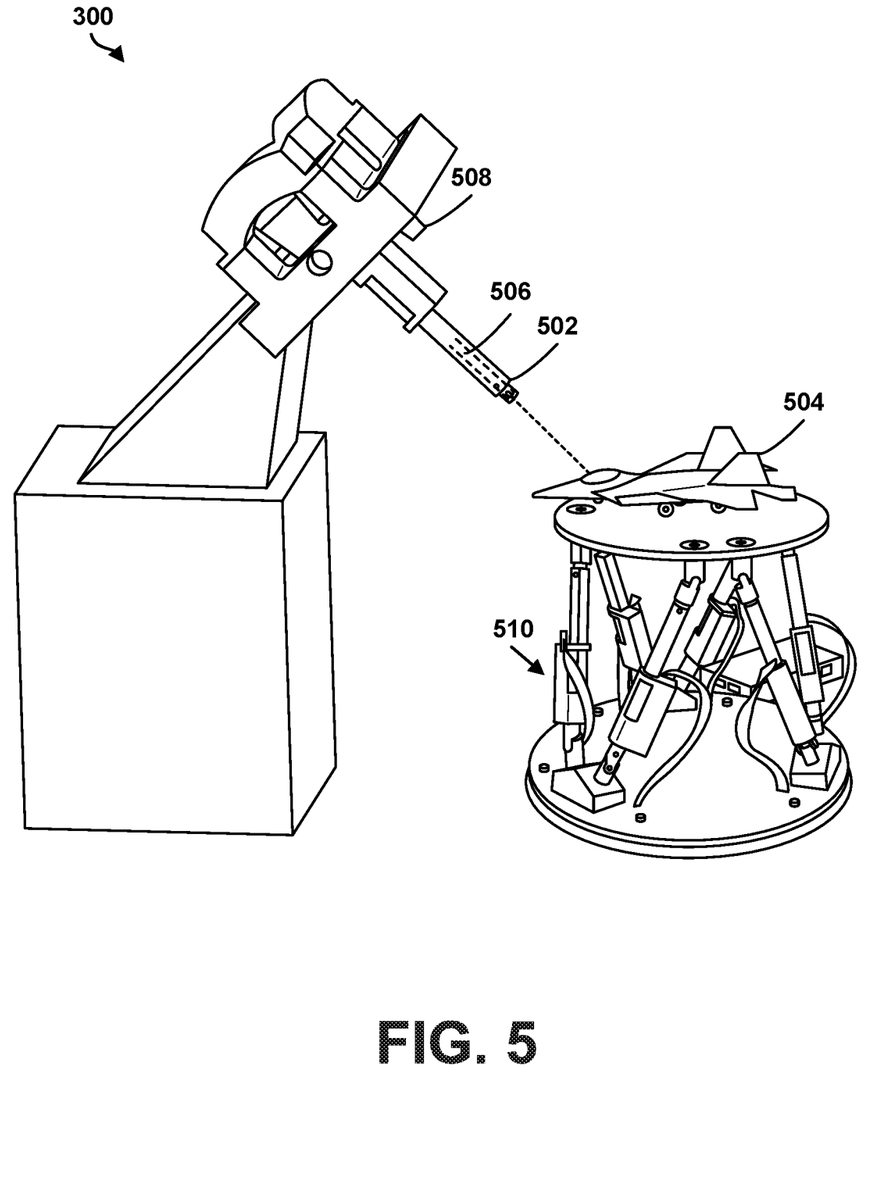
FIG. 5 is a conceptual illustration of a training setup, according to an example.

FIG. 5 is a conceptual illustration 500 of a training setup, according to an example. In line with the discussion above, training images for training a data-driven analyzer can be acquired in a laboratory using a hardware mockup that includes a scaled model 502 of a refueling boom, a scaled model 504 of a receiver aircraft, a laser pointer 506, and a camera 508. Laser pointer 506 is coupled to model 502 such that a laser beam output by laser pointer 506 is aligned with a longitudinal axis of the refueling boom and intersects a surface of model 504 at a location at which the refueling boom would impact the surface if the refueling boom were further deployed. Further, camera 508 is provided in appropriate position and orientation that corresponds to the position and orientation of a camera on a supply aircraft relative to the refueling boom of the supply aircraft.

In operation, a laser beam output by laser pointer 506 intersects with a surface of model 504, producing a dot at the intersection between the laser beam and a surface of model 504. Camera 508 then acquire images as actuators 510 are manipulated (e.g., either manually or programmatically) to vary a position of model 504 of the receiver aircraft relative to model 502 of the refueling boom. In this manner, a plurality of training images can be rapidly generated, for use in training a data-driven analyzer.

In some examples, a separation distance between the refueling boom and the surface of the receiver aircraft can be measured and stored in association with respective training images. This information can be useful for training the data-driven analyzer to estimate a separation distance between the refueling boom and the surface of the receiver aircraft.

Figure 6:
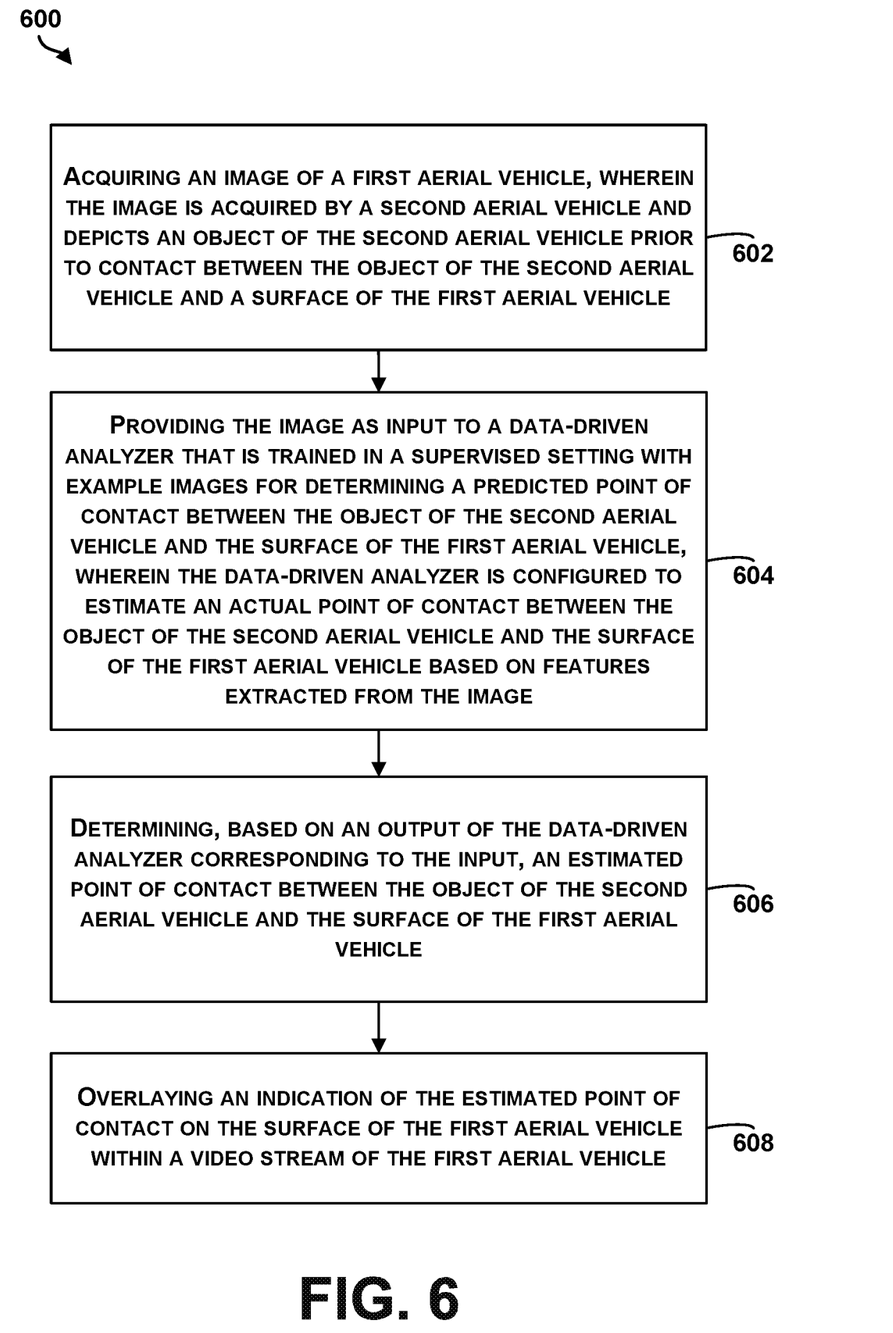
FIG. 6 shows a flowchart of a method, according to an example.

FIG. 6 shows a flowchart of a method 600, according to an example. Method 600 shown in FIG. 6 presents an embodiment of a method that, for example, could be used with system 200 of FIG. 2, for example, or any of the systems disclosed herein. Any of the example devices or systems described herein, such as components of system 200 of FIG. 2, may be used or configured to perform logical functions presented in FIG. 6.

Method 600 can include one or more operations, functions, or actions as illustrated by one or more of blocks 602-608. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 602, method 600 includes acquiring an image of a first aerial vehicle. The image is acquired by a second aerial vehicle and depicts an object of the second aerial vehicle prior to contact between the object of the second aerial vehicle and a surface of the first aerial vehicle. For example, the image can depict a receiver aircraft and a refueling boom of a supply aircraft, prior to contact between the refueling boom and a surface of the receiver aircraft. The image can be acquired during a refueling operation and while the receiver aircraft and supply aircraft are in flight.

At block 604, method 600 includes providing the image as input to a data-driven analyzer that is trained in a supervised setting with example images for determining a predicted point of contact between the object of the second aerial vehicle and the surface of the first aerial vehicle. The data-driven analyzer is configured to estimate an actual point of contact between the object of the second aerial vehicle and the surface of the first aerial vehicle based on features extracted from the image.

At block 606, method 600 includes determining, based on an output of the data-driven analyzer corresponding to the input, an estimated point of contact between the object of the second aerial vehicle and the surface of the first aerial vehicle.

And at block 608, method 600 includes overlaying an indication of the estimated point of contact on the surface of the first aerial vehicle within a video stream of the first aerial vehicle.

Figure 7:
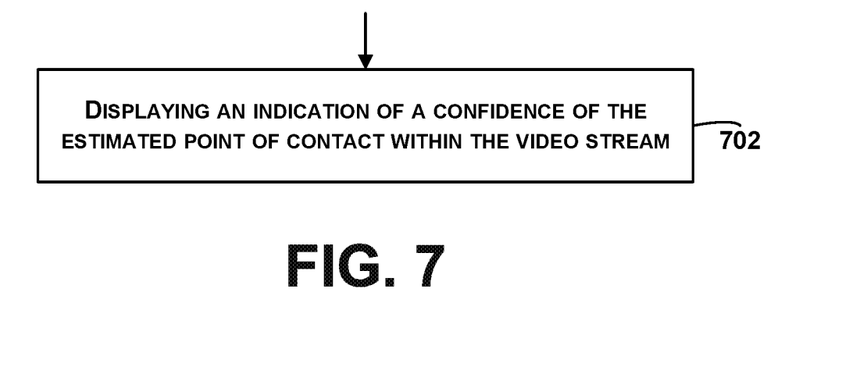
FIG. 7 shows an additional operation for use with the method shown in FIG. 6.

FIG. 7 shows an additional operation for use with the method shown in FIG. 6. Block 702 of FIG. 7 could be performed as part of block 608 of FIG. 6. At block 702, FIG. 7 includes displaying an indication of a confidence of the estimated point of contact within the video stream. For instance, the indication of the confidence can include a size of a shape surrounding the indication of the estimated point of contact and/or a color of the indication of the estimated point of contact.

Figure 8:
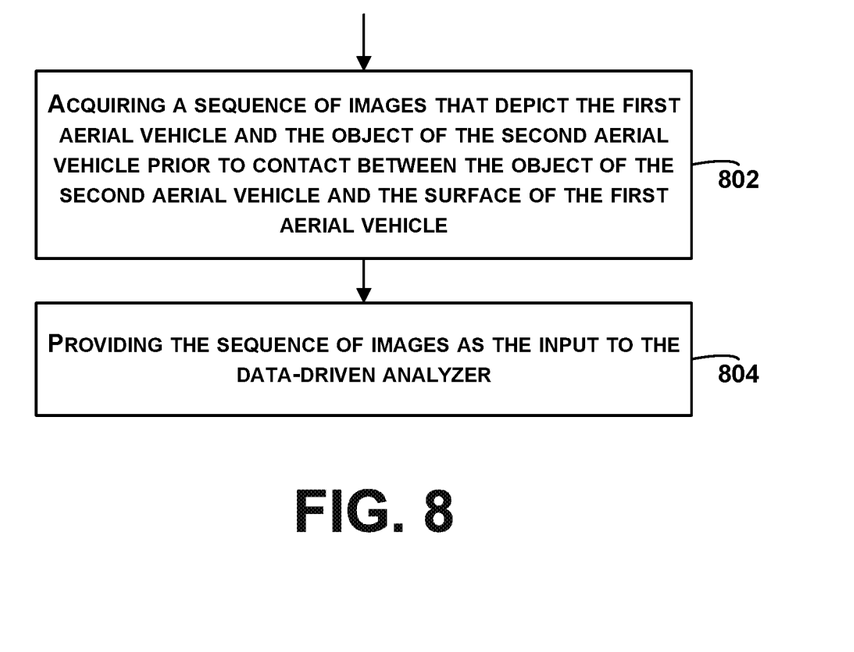
FIG. 8 shows additional operations for use with the method shown in FIG. 6.

FIG. 8 shows additional operations for use with the method shown in FIG. 6. Blocks 802 and 804 of FIG. 8 could be performed as part of block 602 of FIG. 6. At block 802, FIG. 8 includes acquiring a sequence of images that depict the first aerial vehicle and the object of the second aerial vehicle prior to contact between the object of the second aerial vehicle and the surface of the first aerial vehicle. Further, at block 804, FIG. 8 includes providing the sequence of images as the input to the data-driven analyzer. Using a sequence of images rather than a single image can improve the estimate of the point of contact, since the sequence of images can inherently include information about relative motion between the first aerial vehicle and the object of the second aerial vehicle.

Figure 9:
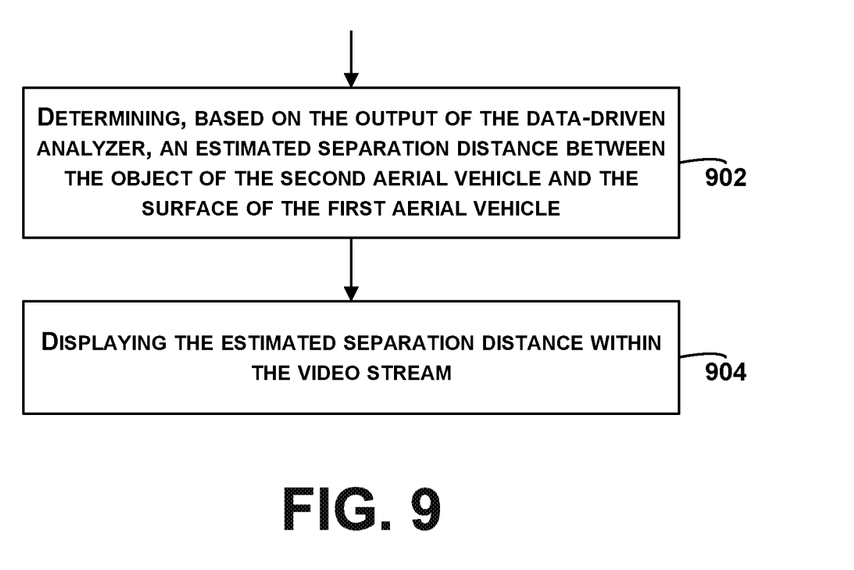
FIG. 9 shows additional operations for use with the method shown in FIG. 6.

FIG. 9 shows additional operations for use with the method shown in FIG. 6. Blocks 902 and 904 of FIG. 9 could be performed before, after, or in parallel with block 606 of FIG. 6, for instance. At block 904, FIG. 9 includes determining, based on the output of the data-driven analyzer, an estimated separation distance between the object of the second aerial vehicle and the surface of the first aerial vehicle.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A system comprising:
a processor; and
a non-transitory computer-readable medium having stored therein instructions that are executable to cause the system to perform functions comprising:
acquiring an image of a first aerial vehicle, wherein the image is acquired by a second aerial vehicle and depicts an object of the second aerial vehicle prior to contact between the object of the second aerial vehicle and a surface of the first aerial vehicle,
providing the image as input to a data-driven analyzer that is trained in a supervised setting with example images for determining a predicted point of contact between the object of the second aerial vehicle and the surface of the first aerial vehicle, wherein the data-driven analyzer is configured to estimate an actual point of contact between the object of the second aerial vehicle and the surface of the first aerial vehicle based on features extracted from the image;
determining, based on an output of the data-driven analyzer corresponding to the input, an estimated point of contact between the object of the second aerial vehicle and the surface of the first aerial vehicle; and
providing the estimated point of contact to a display system.

2. The system of claim 1, wherein the data-driven analyzer comprises a parameterized model that is trained in a supervised setting by introducing a set of example images including the object of the second aerial vehicle and the surface of the first aerial vehicle that provides an output of a predicted point of contact between the object of the second aerial vehicle and the surface of the first aerial vehicle, the parameterized model being configured to estimate an actual point of contact between the object of the second aerial vehicle and the surface of the first aerial vehicle based on features extracted from the image.

3. The system of claim 1, wherein the data-driven analyzer comprises a neural network that is trained in a supervised setting by introducing a set of example images including the object of the second aerial vehicle and the surface of the first aerial vehicle that provides an output of a predicted point of contact between the object of the second aerial vehicle and the surface of the first aerial vehicle, the neural network being configured to estimate an actual point of contact between the object of the second aerial vehicle and the surface of the first aerial vehicle based on features extracted from the image.

4. The system of claim 1, wherein:
the first aerial vehicle is a receiver aircraft,
the second aerial vehicle is a supply aircraft, and
the object of the second aerial vehicle is a refueling boom.

5. The system of claim 1, further comprising a camera configured to acquire the image of the second aerial vehicle.

6. The system of claim 1, further comprising the display system, wherein the display system is configured to display a video stream of the first aerial vehicle and to overlay an indication of the estimated point of contact on the surface of the first aerial vehicle within the video stream.

7. The system of claim 6, wherein:
the output of the data-driven analyzer corresponding to the input comprises a confidence of the estimated point of contact, and
the indication of the estimated point of contact comprises an indication of the confidence.

8. The system of claim 7, wherein the indication of the confidence comprises a size of a shape surrounding the indication of the estimated point of contact.

9. The system of claim 7, wherein the indication of the confidence comprises a color of the indication of the estimated point of contact.

10. The system of claim 1:
wherein the functions further comprise:
acquiring a sequence of images that depict the first aerial vehicle and the object of the second aerial vehicle prior to contact between the object of the second aerial vehicle and the surface of the first aerial vehicle; and
providing the sequence of images as the input to the data-driven analyzer, wherein the image is part of the sequence of images, and
wherein the data-driven analyzer is configured to estimate an actual point of contact based on features extracted from the sequence of images.

11. The system of claim 1:
wherein the functions further comprise:
acquiring an orientation and position of the first aerial vehicle relative to the second aerial vehicle; and
providing the orientation and position as part of the input to the data-driven analyzer, and
wherein the data-driven analyzer is configured to estimate an actual point of contact based on the orientation and position.

12. The system of claim 11, wherein acquiring the orientation and position comprises deriving the orientation and position from the image.

13. The system of claim 1:
wherein the data-driven analyzer is configured to estimate a separation distance between the object of the second aerial vehicle and the surface of the first aerial vehicle, and
wherein the functions further comprise:
determining, based on the output of the data-driven analyzer, an estimated separation distance between the object of the second aerial vehicle and the surface of the first aerial vehicle; and
providing the estimated separation distance to the display system.

14. A method comprising:
acquiring an image of a first aerial vehicle, wherein the image is acquired by a second aerial vehicle and depicts an object of the second aerial vehicle prior to contact between the object of the second aerial vehicle and a surface of the first aerial vehicle;
providing the image as input to a data-driven analyzer that is trained in a supervised setting with example images for determining a predicted point of contact between the object of the second aerial vehicle and the surface of the first aerial vehicle, wherein the data-driven analyzer is configured to estimate an actual point of contact between the object of the second aerial vehicle and the surface of the first aerial vehicle based on features extracted from the image;
determining, based on an output of the data-driven analyzer corresponding to the input, an estimated point of contact between the object of the second aerial vehicle and the surface of the first aerial vehicle; and
overlaying an indication of the estimated point of contact on the surface of the first aerial vehicle within a video stream of the first aerial vehicle.

15. The method of claim 14, wherein:
the first aerial vehicle is a receiver aircraft,
the second aerial vehicle is a supply aircraft, and
the object of the second aerial vehicle is a refueling boom.

16. The method of claim 14, wherein:
the output of the data-driven analyzer corresponding to the input comprises a confidence of the estimated point of contact, and
the indication of the estimated point of contact comprises an indication of the confidence.

17. The method of claim 14, further comprising:
acquiring a sequence of images that depict the first aerial vehicle and the object of the second aerial vehicle prior to contact between the object of the second aerial vehicle and the surface of the first aerial vehicle; and
providing the sequence of images as the input to the data-driven analyzer,
wherein the image is part of the sequence of images, and
wherein the data-driven analyzer is configured to estimate an actual point of contact based on features extracted from the sequence of images.

18. The method of claim 14:
wherein the data-driven analyzer is configured to estimate a separation distance between the object of the second aerial vehicle and the surface of the first aerial vehicle, and
wherein the method further comprises:
determining, based on the output of the data-driven analyzer, an estimated separation distance between the object of the second aerial vehicle and the surface of the first aerial vehicle; and
displaying the estimated separation distance within the video stream.

19. A non-transitory computer-readable medium having stored therein instructions that are executable to cause a system to perform functions comprising:
acquiring an image of a first aerial vehicle, wherein the image is acquired by a second aerial vehicle and depicts an object of the second aerial vehicle prior to contact between the object of the second aerial vehicle and a surface of the first aerial vehicle;
providing the image as input to a data-driven analyzer that is trained in a supervised setting with example images for determining a predicted point of contact between the object of the second aerial vehicle and the surface of the first aerial vehicle, wherein the data-driven analyzer is configured to estimate an actual point of contact between the object of the second aerial vehicle and the surface of the first aerial vehicle based on features extracted from the image;

determining, based on an output of the data-driven analyzer corresponding to the input, an estimated point of contact between the object of the second aerial vehicle and the surface of the first aerial vehicle; and overlaying an indication of the estimated point of contact on the surface of the first aerial vehicle within a video stream of the first aerial vehicle.

20. The non-transitory computer-readable medium of claim 19, wherein:

the first aerial vehicle is a receiver aircraft, the second aerial vehicle is a supply aircraft, and the object of the second aerial vehicle is a refueling boom.

\* \* \* \* \*